Figure 1:
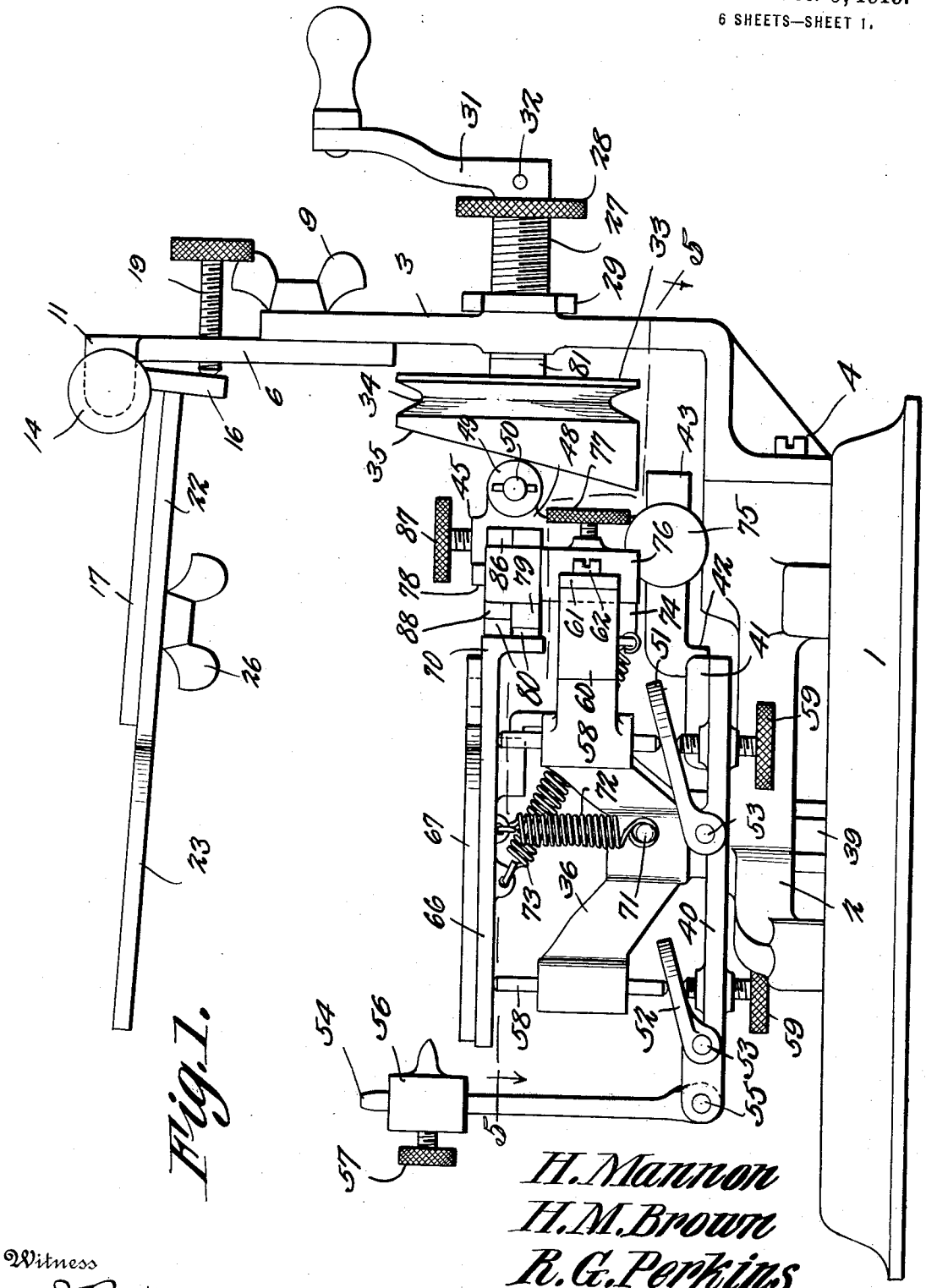

H. MANNON, H. M. BROWN AND R. G. PERKINS.
MECHANICAL ARTICULATOR AND GRINDER.
APPLICATION FILED MAY 22, 1919.

1,324,429.

Patented Dec. 9, 1919.
6 SHEETS—SHEET 1.

H. Mannon
H. M. Brown
R. G. Perkins
INVENTORS

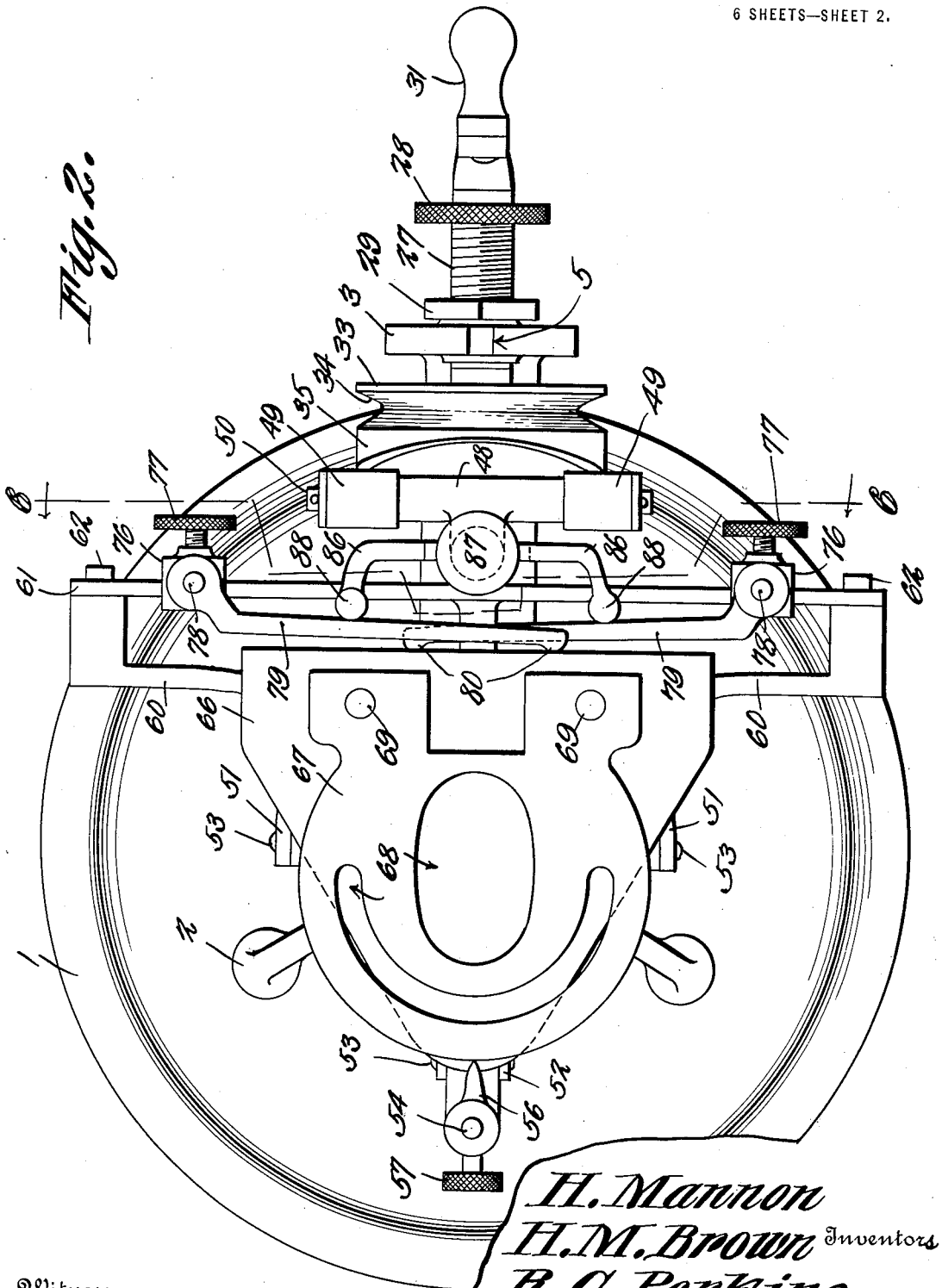

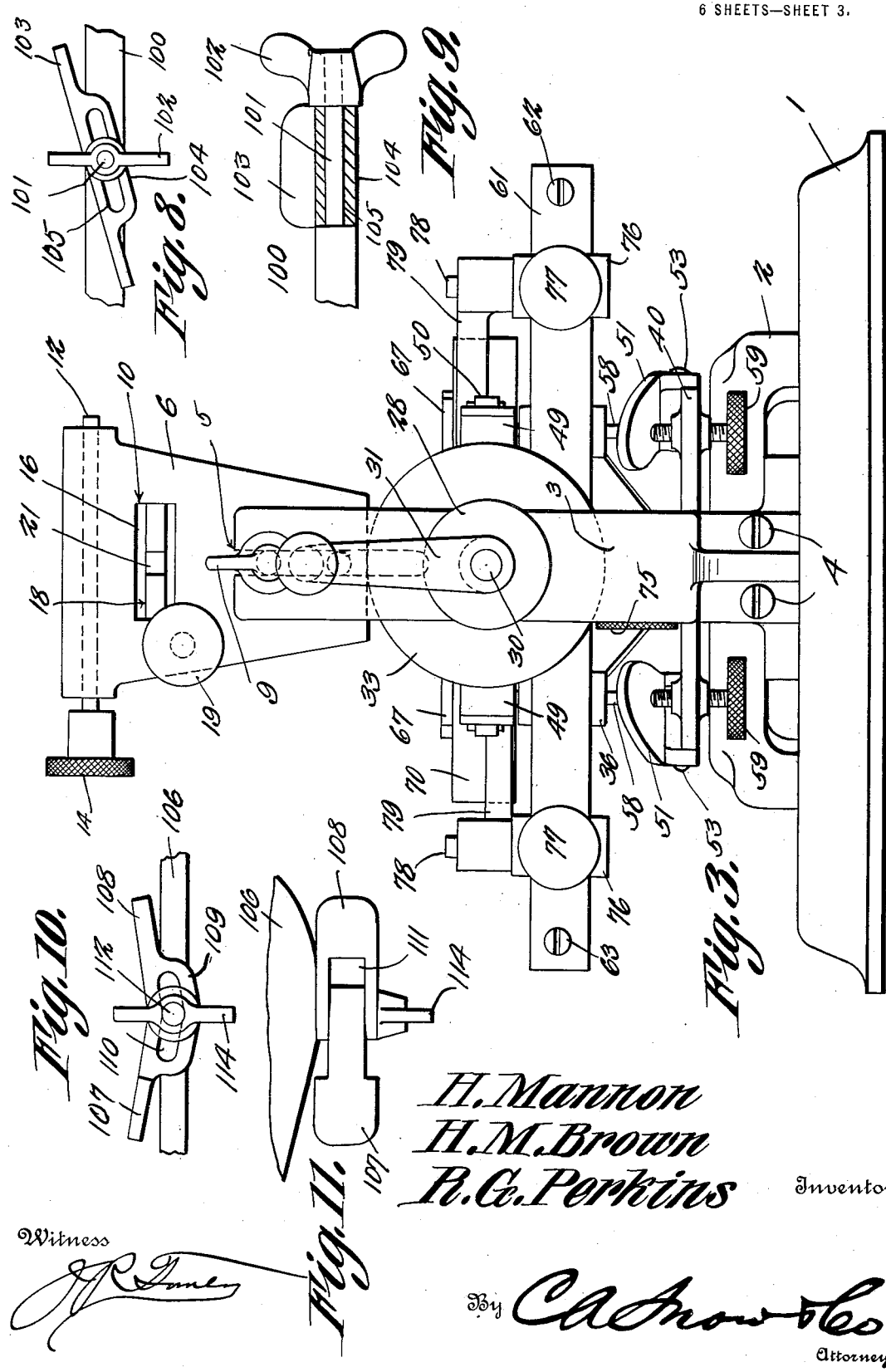

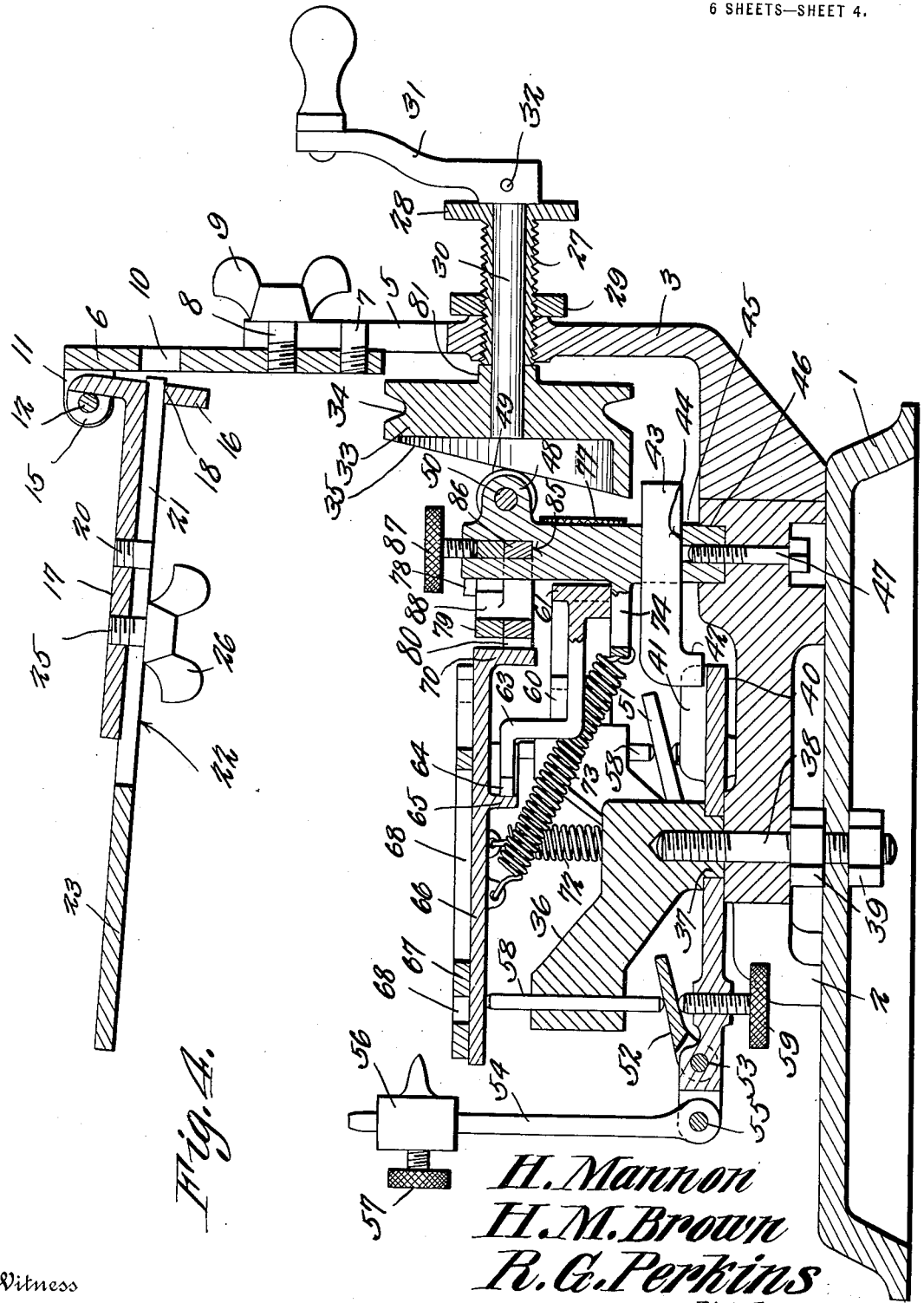

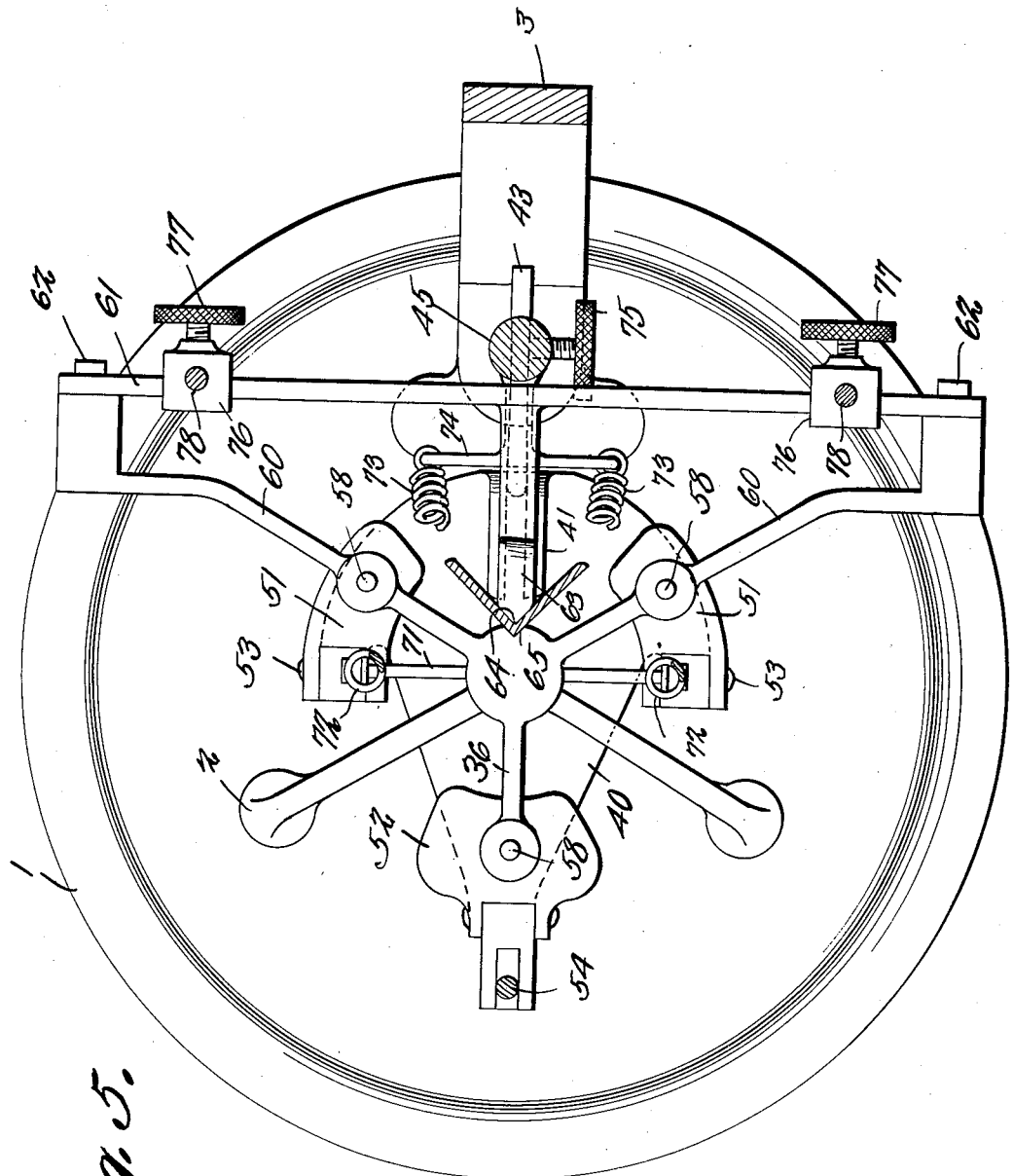

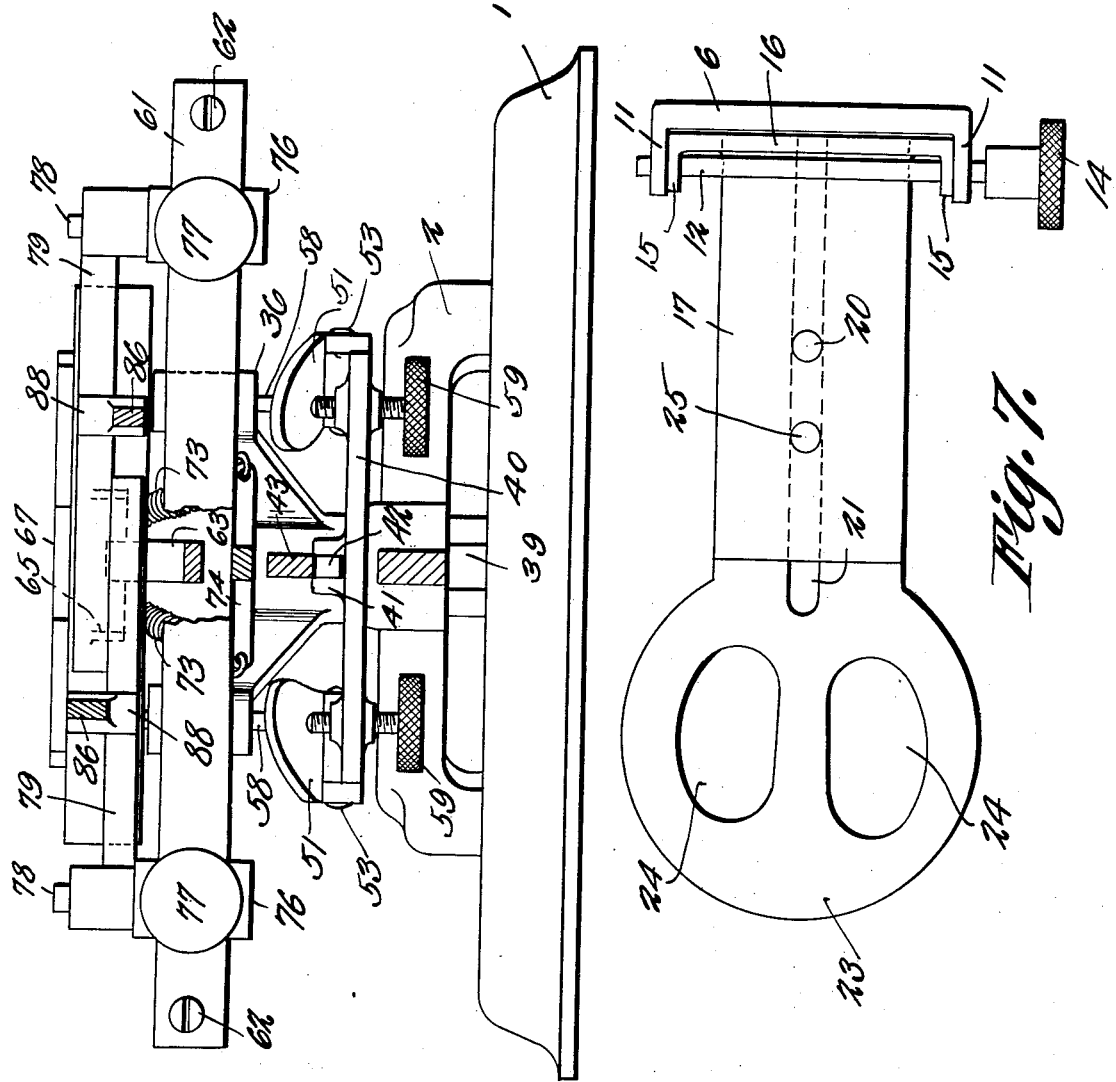

UNITED STATES PATENT OFFICE.

HOMER MANNON, HERMAN M. BROWN, AND ROBERT G. PERKINS, OF HUNTINGTON, WEST VIRGINIA.

MECHANICAL ARTICULATOR AND GRINDER.

1,324,429.     Specification of Letters Patent.     Patented Dec. 9, 1919.

Application filed May 22, 1919. Serial No. 299,067.

*To all whom it may concern:*

Be it known that we, HOMER MANNON, HERMAN M. BROWN, and ROBERT G. PERKINS, citizens of the United States, residing at Huntington, in the county of Cabell, State of West Virginia, have invented a new and useful Mechanical Articulator and Grinder, of which the following is a specification.

The device forming the subject matter of this application is adapted to be used for articulating and grinding artificial teeth, and the invention aims to provide a machine of the sort mentioned, wherein the movements of the mandible in the patient may be reproduced accurately, it being possible to locate the rotating points, to regulate the incisal angle, to regulate the outward and downward path of the mandible, and to reproduce the lateral movements of the mandible even in the presence of abnormal or pathological conditions, such as occur, for instance, in cases where an absorption of the head of the condyle has taken place, due to the extraction of teeth on one side, or when the patient has been edentulous for a long period. In general, the device has for its object, the provision of means for simulating the highly complex movements of the mandible in the act of mastication.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1 shows, in side elevation, a device constructed in accordance with the invention; Fig. 2 is a top plan wherein the upper denture carrier has been removed; Fig. 3 is a rear elevation; Fig. 4 is a vertical longitudinal section wherein parts appear in elevation; Fig. 5 is a horizontal section taken approximately on the line 5—5 of Fig. 1; Fig. 6 is a transverse section taken approximately on the line 6—6 of Fig. 2; Fig. 7 is a plan disclosing the upper denture carrier, and the parts whereon the same is supported pivotally; Fig. 8 is a fragmental elevation showing a slight modification in one part of the machine; Fig. 9 is a vertical section of the structure shown in Fig. 8, parts being in elevation; Fig. 10 is an elevation showing another modification; Fig. 11 is a plan of the structure shown in Fig. 10.

In carrying out the invention, there is provided a base 1, which may be of circular outline. A tripod 2 is fixed to the base 1, an upwardly projecting standard 3 being secured to the tripod, as shown at 4, the standard being located at the rear of the machine as disclosed in Fig. 1 of the drawing. By comparing Fig. 3 with Fig. 4, it will be seen that the standard 3 is provided at its upper end with a slot 5. The numeral 6 designates an extension, having a projection 7 received slidably in the slot 5 of the standard 3. A clamp screw 8 is located in the slot 5 and is threaded into the extension 6, the clamp screw being provided with a wing head 9 which bears against the rear face of the standard 3. An opening 10 is fashioned in the extension 6, near to the upper end thereof, the extension being equipped at its upper end with forwardly extended ears 11 in which a pivot member 12 is removably mounted, the pivot member having a head 14, to the end that the pivot member may be manipulated readily.

The pivot member 12 serves as a support on which an upper denture carrier is mounted to swing vertically. The upper denture carrier is a composite structure and comprises an arm 17 provided at its rear end with a cross piece 16 having ears 15 mounted on the pivot member 12. The cross piece 16 is provided, below the arm 17, with an opening 18 adapted to receive the shank 22 of a plate 23 provided with anchoring openings 24 whereby an upper denture (not shown) may be secured to the plate. There is a depending stud 20 on the arm 17, received in a slot 21 formed in the shank 22 of the plate 23. An adjusting screw 25 is located in the slot 21 and is threaded at its upper end into the arm 17, the screw having a wing head 26 coacting with the shank 22 of the plate 23 of the denture carrier. An adjusting screw 19 is threaded into the upper end of the extension 6 and is adapted to bear upon the lower end of the cross piece 16.

A tubular bearing 27 is threaded into the standard 3 and is manipulated by a turning flange 28 on the rear end of the bearing. A lock nut 29 is threaded on the bearing 27 and engages the standard 3. A shaft 30 is journaled for rotation in the bearing 27 and may be manipulated by any suitable means. If desired, a crank 31 may be secured at 32 to the rear end of the shaft 30, to procure a rotation of the shaft. A wheel 33 is fixed upon the forward end of the shaft 30 and includes a hub 81 against which the forward end of the tubular bearing 27 abuts. The wheel 33 is supplied with a grooved thread 34, so that the shaft 30 can be rotated from a source of power, if desired, the wheel being equipped with a forwardly presented cam flange 35.

The invention comprises a spider 36 having a central boss 37 resting on the hub of the tripod 2 and secured thereto by a screw 38 mounted in the hub of the tripod and in the base 1 and held upon these parts by nuts 39, the spider 36 thus being fixed with respect to the tripod 2 and to the base 1. A horizontally rocking member, in the form of a plate 40 is mounted to swing on the central boss 37 of the spider 36, between the hub of the spider and the hub of the tripod 2. At its rear end, the member 40 is equipped with a grooved guide 41.

The guide 41 receives a depending finger 42 fashioned on the forward end of a crank arm 43 mounted in an opening 44 in a vertical shaft 45, the crank arm being held adjustably in the opening of the shaft through the instrumentality of a set screw 75 which is threaded into the shaft. The lower end of the shaft 45 is journaled for rocking movement in a bearing recess 46 formed in the rear end portion of the tripod 2, the shaft being held for rotation in the recess by a screw 47 journaled in the rear portion of the tripod and threaded at its upper end into the lower end of the shaft, as clearly disclosed in Fig. 4. The shaft 45 carries, as shown to best advantage in Figs. 2 and 4, a cross piece 48 supporting a spindle 50, on the ends of which, rollers 49 are journaled, the rollers being adapted to coöperate with the cam flange 35 of the wheel 33.

The invention comprises side tracks 51 and a forward track 52, the tracks 51 and 52 being pivoted at 53 to the member 40 for vertical swinging adjustment responsive to screws 59 threaded upwardly through the member 40. A rod 54 is pivoted at 55 to the forward end of the member 40 for swinging movement in a vertical plane, an indicator 56 being slidable for adjustment, longitudinally of the rod, the indicator being held on the rod by a set screw 57 threaded into the indicator and adapted to engage the rod. In the extremities of the arms of the spider 36, plungers 58 are mounted for vertical sliding movement.

The rear arms of the spider 36 are supplied with lateral extensions 60 to the rear extremities of which, a transverse guide strip 61 is secured, as indicated at 62. A projection 63 extends forwardly from the intermediate portion of the guide strip 61 and is pointed at 64, at its forward end, to coact with a V-shaped seat 65, secured to the under surface of a table 66 supported on the plungers 58, the table constituting a part of a lower denture carrier. A plate 67 is secured at 69 to the table 66 and has openings 68 facilitating the anchoring of a lower denture (not shown) to the plate 67 and consequently to the table 66.

At its rear end, the table 66 of the lower denture carrier is provided with a depending flange 70. A cross pin 71 is mounted in the hub of the spider 36. The lower ends of vertical retractile springs 72 are attached to the cross pin, the upper ends of the retractile springs being secured to the table 66. The forward ends of rearwardly and downwardly inclined retractile springs 73 are connected to the table 66, the rear ends of the springs 73 being connected with a T-shaped part 74 on the shaft 45.

Riders 76 are mounted for sliding adjustment, toward and away from each other, on the guide strip 61, the riders being held in adjusted positions by set screws 77, threaded into the riders, and adapted to engage the guide strip. The riders 76 include spindles 78 on which radius rods 79 are mounted to swing, the radius rods projecting inwardly toward the median plane of the machine as shown in Fig. 2. At their inner ends, the radius rods 79 are supplied with forwardly presented lugs 80 adapted to bear on the depending flange 70 which constitutes a part of the table 66. The shaft 45 is provided with a transverse opening, 85, wherein arms 86 are longitudinally adjustable, the arms being held in the shaft by a set screw 87, threaded into the top of the shaft and adapted to exert a binding pressure on the arms. The arms 86 include fingers 88, disclosed clearly in Figs. 5 and 6, and coöperating with the respective radius rods 79 at any points on the rods 79 necessary to reproduce the travel of the mandible, the tracks 51 and 52 aiding in bringing about the result above mentioned.

Let it be assumed that an upper denture has been attached to the plate 23, a lower denture having been attached to the plate 67, the median planes of the dentures having been made coincident, through the instrumentality of the indicator 56, in a way clearly understood by those skilled in the art.

Let it be supposed, further, that rotation is imparted to the shaft 30 by way of the crank 31 or by way of the wheel 33 and its groove thread 34. When the wheel 33 is rotated, the cam flange 35 thereof coöperates with the rollers 49 on the spindle 50, the cross piece 48 being oscillated in a horizontal plane, and an oscillating rotary movement being imparted to the shaft 45. The shaft 45 carries the arms 86, the fingers 88 on the forward ends of the arms engaging the radius rods 79 and causing the radius rods to swing in a horizontal plane on the spindles 58 of the riders 76. When the radius rods 79 swing in a horizontal plane, the lugs 80 on the inner ends of the radius rods coöperate with the depending flange 70 of the table 66 and impart a lateral swinging movement to the table. The table 66 is held down on the plungers 58 by the springs 72, and is retracted, to some extent, by these springs, although, essentially, the retraction of the table is due to the action of the rearwardly and downwardly inclined springs 73. When the shaft 45 is oscillated, as aforesaid, the T-shaped part 74 on the shaft participates in the oscillating movement, and since the rear ends of the springs 73 are secured to the T-shaped part 74, the springs will be tensioned when the shaft 45 is rocked. As the table 66 moves rearwardly, the pointed end 64 of the projection 63 on the guide strip 61 coacts with the V-shaped seat 65 on the bottom of the table, and serves to center the table.

The table 66 of the lower denture carrier reciprocates on the upper ends of the plungers 58, as aforesaid. When the shaft 45 is rocked, a horizontal swinging movement is imparted to the member 40, since the finger 42 on the crank arm 43 of the shaft 45 is received slidably in the guide 41 on the member 40. Recalling that the arm 43 may be adjusted lengthwise in the shaft
45 45 that is, transversely of the shaft, the distance between the finger 42 and the axis of rotation of the shaft may be varied, thereby to increase or decrease the speed of angularity which forms the compensating curve.
When the member 40 is oscillated in a horizontal plane, by the action of the crank arm 43, the side tracks 51 move in an arc, the center of which is the axis of the screw 38, and because the tracks are inclined, the rearmost plungers 58, which coact with the side tracks 51, will be raised and lowered, a corresponding lateral tilting movement being imparted to the table 66, the table moving with the foremost plunger 58 as a support, the said plunger 58 being sustained on the forward track 52. The vertical movement which is imparted to the foremost plunger 58, when the forward track 52 moves therebeneath determines the incisal angle. From the foregoing it will be noted that a compound movement is imparted to the table 66 of the lower denture carrier, and the movement of the denture on the lower carrier with respect to the denture on the upper carrier simulates closely and accurately, the movement of the mandible in the patient.

Passing to the adjustments, if the screw 8 is loosened, the extension 6 and parts carried thereby may be adjusted vertically with respect to the standard 3, or be removed therefrom. The adjusting screw 19 varies the angle of the plate 23 with respect to the horizontal, since the screw bears against the lower portion of the cross piece 16. When the screw 25 is loosened, the plate 23 may be adjusted longitudinally of the arm 17. The bearing 27 may be threaded forwardly or backwardly in the standard 3, so as to bring the cam flange 35 of the wheel 33 into proper relation to the rollers 49 on the cross piece 48 of the shaft 45, the bearing 27 and the wheel 33 being held in adjusted positions by advancing the lock nut 29 until the same coöperates with the standard 3.

When the set screw 87 is loosened, the arms 86 may be adjusted transversely of the shaft 45, so as to regulate the points at which the fingers 88 bear upon the radius rods 79. The riders 76 may be shifted along the guide strip 61, and be held in place by the set screws 77, thereby altering the relations between the lugs 80 on the inner ends of the radius rods and regulating the points at which these lugs engage the flange 70 of the table 66. It is possible to move the riders 76 outwardly in opposite directions until the lugs 80 on the radius rods 79 are in vertical alinement and then a right line reciprocation, forwardly and backwardly, will be imparted to the table 66.

The crank arm 43 may be adjusted in the shaft 45, to vary the effective length of the crank arm, the crank arm being held in adjusted positions by the screw 75. Recalling that the finger 42 on the crank arm 43 is engaged with the guide 41 of the member 40, it will be seen that when the arm 43 is adjusted, as aforesaid, the throw which is imparted to the member 40, will be varied. The angle of the side tracks 51 with respect to the horizontal may be adjusted by means of the corresponding screws 59, thereby to define the condyle path. The angle of the forward track 52 can be changed by manipulating the screw 59 which operates beneath the track, and in this way, the incisal angle may be determined.

It is not necessary that the tracks 51 be mounted precisely as described. Thus, in Fig. 8, the numeral 100 denotes the horizontally rocking member or table, corresponding to the table 40, the member 100 having studs 101 carrying wing nuts 102. The track 103 has a depending extension 104 provided with a slot 105 receiving the stud 101. The track 103 may be adjusted lengthwise or be tilted, the nut 102 being tightened up to hold the track in adjusted positions.

Referring to Figs. 10 and 11, the table appears at 106, the stud at 112 and the wing nut at 114. The track is composed of two parts 107 and 108, the part 108 having an opening 111 receiving the inner end of the part 107. The members 107 and 108 of the track are provided at their inner ends with depending extensions 109 having slots 110 receiving the stud 112. The parts 107 of the track may be adjusted longitudinally and may be swung upwardly and downwardly, at their outer ends.

The machine hereinbefore described is adapted to be used with a device for recording the movements of the mandible, but since the specific recording device cannot be claimed in this application, and since recourse may be had to known recording devices, no particular recording mechanism is shown or described.

Having thus described the invention, what is claimed is:—

1. In a device of the class described, a frame; a member mounted for oscillating rotary movement thereon; inclined tracks on said member; plungers freely slidable in the frame and actuated by the tracks; a lower denture carrier movably supported on the plungers; and means for oscillating said member and for moving the denture carrier simultaneously.

2. In a device of the class described, a frame; a member mounted for rotary oscillating movement thereon; tracks pivoted to said member; means carried by said member for varying the angle of the tracks with respect to said member; plungers freely slidable in the frame and actuated by the tracks; a lower denture carrier movably supported on the plungers; and means for oscillating said member and for moving the denture carrier simultaneously.

3. In a device of the class described, a frame; a member mounted for oscillating rotary movement thereon; side tracks carried by said member and inclined circumferentially of the arc in which said member oscillates; a forward track on said member and inclined radially of the arc in which said member oscillates; plungers freely slidable in the frame and actuated by the tracks; a lower denture carrier movably supported on the plungers; and means for oscillating said member and for moving the denture carrier simultaneously.

4. In a device of the class described, a frame; a member mounted for oscillating rotary movement on the frame; side tracks pivoted to said member and inclined circumferentially of the arc in which said member oscillates; a forward track pivoted to said member and inclined radially of the arc in which said member oscillates; means carried by said member for adjusting the angles between the tracks and said member; plungers freely slidable in the frame and actuated by the tracks; a lower denture carrier movably supported on the plungers; and means for oscillating said member and for moving the denture carrier simultaneously.

5. In a device of the class described, a frame; a member mounted for oscillating rotary movement thereon and having inclined tracks; an upper denture carrier; means coöperating with the tracks for supporting the carrier slidably; and mechanism for oscillating said member and for moving the carrier simultaneously, said mechanism including means for imparting an adjusted oscillating movement to said member.

6. In a device of the class described, a frame; a member mounted for oscillating rotary movement thereon and having inclined tracks; an upper denture carrier; means coöperating with the tracks for supporting the carrier movably; a shaft journaled in the frame; means for operatively connecting the shaft with the denture carrier; a crank arm coöperating with said member; and means for mounting the crank arm adjustably in the shaft, thereby to vary the throw imparted to said member.

7. In a device of the class described, a frame; a lower denture carrier movable with respect to the frame; radius rods engaged at their inner ends with the carrier; means for mounting the outer ends of the radius rods on the frame for pivotal movement and for adjustment toward and away from each other; and means for operating the radius rods.

8. In a device of the class described, a frame; a lower denture carrier movable with respect to the frame; riders adjustable on the frame, toward and away from each other; means for holding the riders in adjusted positions on the frame; radius rods pivoted at their outer ends to the riders and engaged at their inner ends with the denture carrier; and means for actuating the radius rods.

9. In a device of the class described, a frame; a lower denture carrier movable with respect to the frame; radius rods engaged at their inner ends with the carrier; means for pivotally supporting the outer ends of the radius rods on the frame; a shaft journaled in the frame; and arms carried by the shaft, the arms engaging the radius rods intermediate the ends thereof.

10. In a device of the class described, a frame; a lower denture carrier movable with respect to the frame; radius rods engaged at their inner ends with the carrier; means for mounting the outer ends of the radius rods on the frame for pivotal movement and for adjustment toward and away from each other; a shaft journaled in the frame; and arms carried by the shaft, the arms coöperating with the radius rods.

11. In a device of the class described, a frame; a lower denture carrier movable with respect to the frame; radius rods engaged at their inner ends with the carrier; means for mounting the outer ends of the radius rods on the frame for pivotal movement and for adjustment toward and away from each other; a shaft journaled in the frame; arms coöperating with the radius rods; and means for mounting the arms in the shaft adjustably, thereby to vary the distance between the points of engagement between the arms and the radius rods.

12. In a device of the class described, a frame; a lower denture carrier movable with respect to the frame; radius rods engaged at their inner ends with the carrier; means for mounting the outer ends of the radius rods pivotally on the frame; a shaft journaled in the frame; arms engaged at their outer ends with the radius rods; and means for mounting the arms adjustably in the shaft, thereby to vary the distance between the outer ends of the arms.

13. In a device of the class described, a frame; a lower denture carrier movable with respect to the frame; radius rods engaged at their inner ends with the carrier and constituting means for advancing the carrier; means for pivotally assembling the outer ends of the radius rods with the frame; means for actuating the radius rods; spring means for retracting the carrier; a seat on the carrier; and a projection on the frame, the projection coöperating with the seat to center the carrier when the carrier is retracted by said spring means.

14. In a device of the class described, a frame; a lower denture carrier movable with respect to the frame; a shaft journaled in the frame; means actuated by the shaft for advancing the denture carrier; springs connected with the carrier to retract the carrier; and means for connecting the springs to the shaft on opposite sides of the shaft, thereby to tension the springs when the shaft is actuated.

15. In a device of the class described, a frame; a member mounted for rotary oscillating movement on the frame; side tracks pivoted to said member; means for adjusting the tracks angularly with respect to said member; plungers slidable in the frame and coöperating with the tracks; an upper denture carrier movably mounted on the plungers; a shaft journaled in the frame; means operated by the shaft for advancing the carrier; means operated by the shaft for imparting rotary oscillating movement to said member; spring means for retracting the carrier; and mechanism for operatively connecting the spring means with the shaft, to tension the spring means.

16. In a device of the class described, a frame; a lower denture carrier movably mounted with respect to the frame; radius rods coöperating at their inner ends with the carrier; means for pivotally supporting the outer ends of the radius rods on the frame; a first shaft journaled in the frame; arms carried by the first shaft and engaging the radius rods; a cross piece on the first shaft; a cam wheel coacting with the cross piece; a second shaft whereon the cam wheel is mounted; a tubular bearing wherein the second shaft is journaled, the bearing being adjustable in the frame to move the cam wheel for adjustment toward and away from the cross piece; and mechanism for holding the bearing in adjusted positions in the frame.

In testimony that we claim the foregoing as our own, we have hereto affixed our signatures in presence of two witnesses.

HOMER MANNON.
HERMAN M. BROWN.
ROBERT G. PERKINS.

Witnesses:
W. A. JOHNSON,
J. A. PACK.